United States Patent
Nichols

(10) Patent No.: US 7,263,798 B2
(45) Date of Patent: Sep. 4, 2007

(54) REMOVABLE HEAD FOR A FISHING LURE

(75) Inventor: Mark S. Nichols, Stuart, FL (US)

(73) Assignee: D.O.A., Inc., Stuart, FL (US)

( * ) Notice: Subject to any disclaimer, the term of this patent is extended or adjusted under 35 U.S.C. 154(b) by 0 days.

(21) Appl. No.: 11/029,443

(22) Filed: Jan. 5, 2005

(65) Prior Publication Data

US 2006/0143972 A1  Jul. 6, 2006

(51) Int. Cl.
    *A01K 85/00* (2006.01)
(52) U.S. Cl. ............ 43/42.09; 43/42.24; 43/42.26
(58) Field of Classification Search ........... 43/42.35, 43/42.26, 42.27, 44.4, 42.24, 42.09
    See application file for complete search history.

(56) References Cited

U.S. PATENT DOCUMENTS

| | | | | |
|---|---|---|---|---|
| 2,027,069 A | * | 1/1936 | Sorenson | 43/42.06 |
| 2,736,981 A | * | 3/1956 | Bonanno | 43/42.35 |
| 2,875,549 A | * | 3/1959 | O'Sullivan | 43/42.22 |
| 2,994,982 A | * | 8/1961 | Murawski | 43/35 |
| 3,760,529 A | * | 9/1973 | Hicks | 43/41 |
| 3,893,255 A | * | 7/1975 | Hicks | 43/41 |
| 3,894,350 A | * | 7/1975 | Parker | 43/42.31 |
| 4,133,132 A | * | 1/1979 | Ellis et al. | 43/41 |
| 4,141,170 A | * | 2/1979 | Fosher | 43/42.24 |
| 4,848,023 A | * | 7/1989 | Ryder et al. | 43/44.2 |
| 4,881,340 A | * | 11/1989 | Davis | 43/42.06 |
| 5,261,181 A | * | 11/1993 | Melton | 43/42.06 |
| 5,377,442 A | * | 1/1995 | Gariglio | 43/44.4 |
| 5,778,593 A | * | 7/1998 | Baron | 43/41 |
| 5,893,232 A | * | 4/1999 | Horton et al. | 43/42.35 |
| 6,061,948 A | * | 5/2000 | Boucek | 43/42.09 |
| 6,708,442 B2 | * | 3/2004 | Kress et al. | 43/44.4 |
| 2006/0010764 A1 | * | 1/2006 | Frawley et al. | 43/42.09 |

* cited by examiner

*Primary Examiner*—Kurt Rowan
(74) *Attorney, Agent, or Firm*—Akerman Senterfitt; Michael K. Dixon

(57) ABSTRACT

A removable head for a fishing lure for changing the action of the fishing lure. The removable head may convert a lure, such as, but not limited to, a soft-bodied lure, into a diving lure, a rising lure, a chugger, a popper, or others. The removable head may slide onto the head of a lure and include a front face for creating action. The front face may include a number of configurations such as, but not limited to, an angled surface, a concave surface, and others.

18 Claims, 3 Drawing Sheets

REMOVABLE HEAD FOR A FISHING LURE

FIELD OF THE INVENTION

This invention is directed generally to fishing lures, and more specifically to soft bodied fishing lures.

BACKGROUND OF THE INVENTION

Artificial lures have been used for many years to catch fish in rivers, lakes, estuaries, bays, and oceans. Artificial lures typically are formed from either hard or soft materials. Hard bodied lures commonly have hooks attached to an outer surface of the lure, while soft bodied lures often have hooks completely concealed within the lure or at least partially concealed in cavities in the lures. Soft bodied lures are typically molded into a single body having many different exterior configurations. Some conventional soft bodied lures include baitfish, grubs, jerk baits, tube lures, artificial worms, some of which resemble naturally occurring earthworms, crawfish, frogs, and others. Soft bodied lures often have tails made from various configurations, such as a straight tail, a paddle tail, a forked tail, a ripple tail, a rounded tail, a pointed tail, and others. Each lure has a distinctive action when retrieved through the water. However, the action produced by each lure is not successful in enticing all fish to strike under all weather conditions, in all water conditions, and in all geographic locations.

Anglers have attempted to solve this problem by carrying one of each type of lure so that the anglers may have the best lure for all water and weather conditions for a particular species of fish. However, attempting such a feat can be overwhelming as there exist many different types of lures, all with distinctly different actions, and many different colors for each lure. The number of different lures and colors makes it impossible for an angler to bring all possible lures with the angler on a fishing trip. Thus, a need exists for a device capable increasing the versatility of each lure to increase the effectiveness of the tackle available to an angler.

SUMMARY OF THE INVENTION

This invention is directed to a removable head configured to be positioned on a fishing lure that simulates a natural baitfish, crustacean, or other prey when suspended in water. Attachment of the removable head to a lure changes the action of the lure thereby increasing the versatility of the lure. The removable head can change a conventional soft-bodied lure into a diving lure, a rising lure, a popper, a chugger, or others, or any combination thereof. The removable head may be placed onto lures designed to catch fish in saltwater, freshwater, or brackish water environments.

In at least one embodiment, the removable head may be formed from a body and a cavity positioned in the body for receiving a head of a fishing lure. The cavity may extend through a rear wall of the body and into close proximity to a front face of the removable head. The body of the removable head may be generally cylindrical or have other appropriate shapes. The cavity may be cylindrical or have other appropriate shapes and may be positioned generally along a longitudinal axis of the body.

The removable head may also include a front face on the body. The front face may create a substantial portion of the action produced by a lure to which the removable head is attached. The front face may have numerous configurations for providing action to the lure to which the head is attached. For instance, the front face may be angled such that the front face proximate to an upper surface of the body extends further from a midpoint of the body along a longitudinal axis of the body than the front face proximate to the lower surface. The front face may be angled between about 45 degrees and about 75 degrees, and more specifically, about 60 degrees. The front face may also be concave in addition to the angled front face and in embodiments without the angled face.

The removable head may include one or more eyes on the head. In at least one embodiment, the removable head may include a first eye protruding from a first side of the body proximate to the front face and a second eye protruding from a second side of the body generally opposite to the first eye and proximate to the front face. The eyes may be generally hemispherical. The removable head may also include one or more fins extending from the body. The body may include a first lateral fin extending from a first side of the body, and a second lateral fin extending from a second side of the body generally opposite the first lateral fin.

The removable head may be attached to a lure by inserting a lure into the cavity in the head. In at least one embodiment, a hook may be inserted through the front face of the removable head, into the lure, and through a bottom surface of the head. The hook may then extend through the body of the lure such that the barb of the hook may rest against the lure, thereby creating a weedless lure. The hook may be attached to the lure in other manners as well.

A lure with the removable head attached may be cast and retrieved or fished in other manners. The lure may be retrieved in a number of ways to simulate a baitfish and to entice a nearby fish to strike. The removable head in at least one embodiment may, together with a lure, form a generally neutrally buoyant lure that, when retrieved, rises in the water column. In an alternative embodiment, the head may be attached to a lure in an inverted position, which causes the lure to dive when retrieved. The lure may also be retrieved at or near the surface. The removable head may be used as a chugger or popper by retrieving a lure with the removable head attached at the water surface and jerking the lure. The removable head may also be retrieved very quickly at the water surface to create a bubble trail, also referred to as a smoke trail, behind the lure.

An advantage of this invention is that the removable head can transform nearly any lure into a lure having a different action by sliding the removable head onto a head of the lure. The removable head can change the action of a lure into a rising lure, a diving lure, a chugging lure, a popping lure, a smoke trail lure, and others, thereby greatly increasing the versatility of conventional lures.

Another advantage of this invention is that removable head can change the attitude of a lure when the lure rests in a water body, thereby changing the action of the lure.

Yet another advantage of this invention is that the removable head takes up relatively little space thereby making it an easy addition to any tackle box.

These and other embodiments will be described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF PREFERRED EMBODIMENTS

Figure 1:
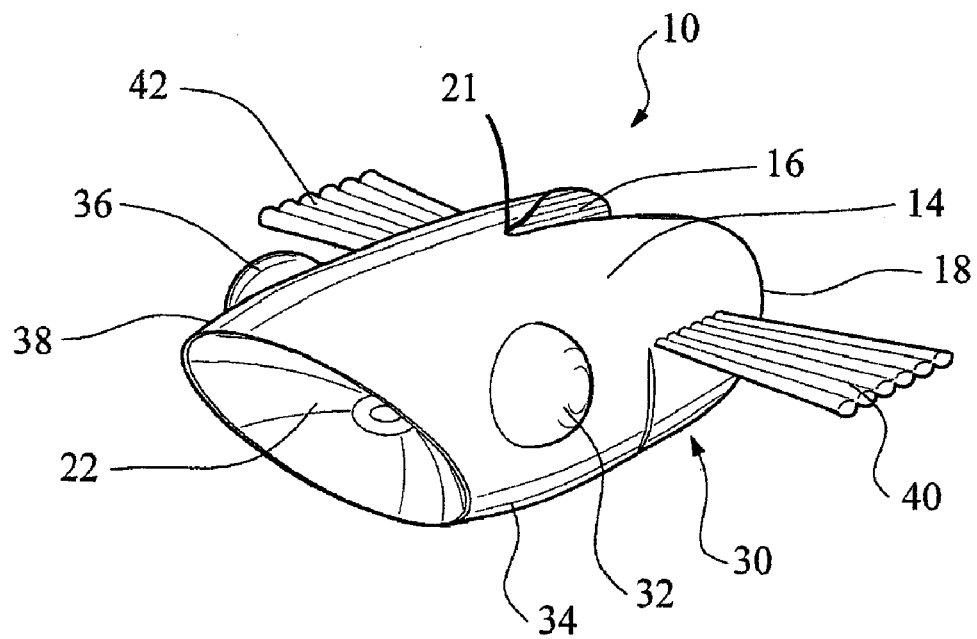
FIG. 1 is a perspective view of a removable head for a fishing lure according to an embodiment of the invention.
Figure 2:
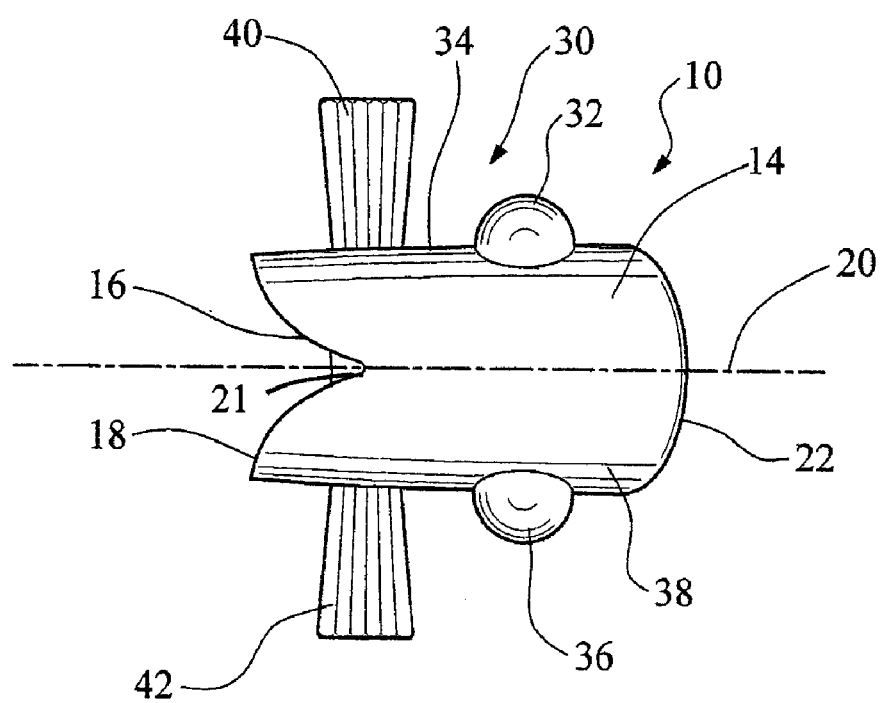
FIG. 2 is a top view of the removable head shown in FIG. 1.
Figure 3:
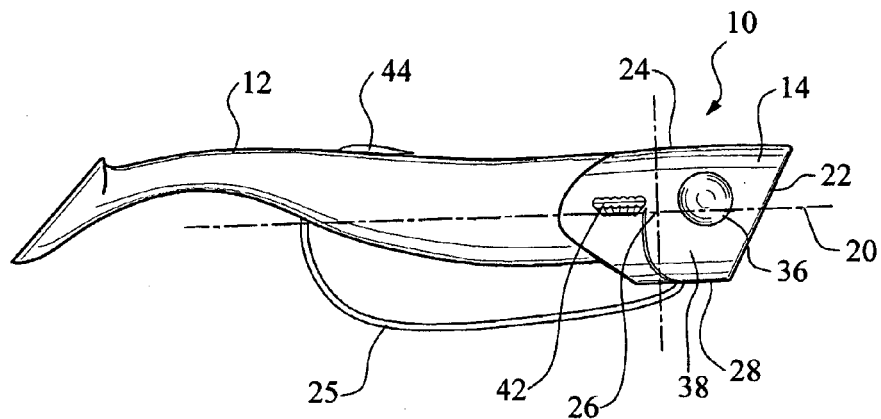
FIG. 3 is a left side view of the removable head shown in FIG. 1 attached to a lure.
Figure 4:
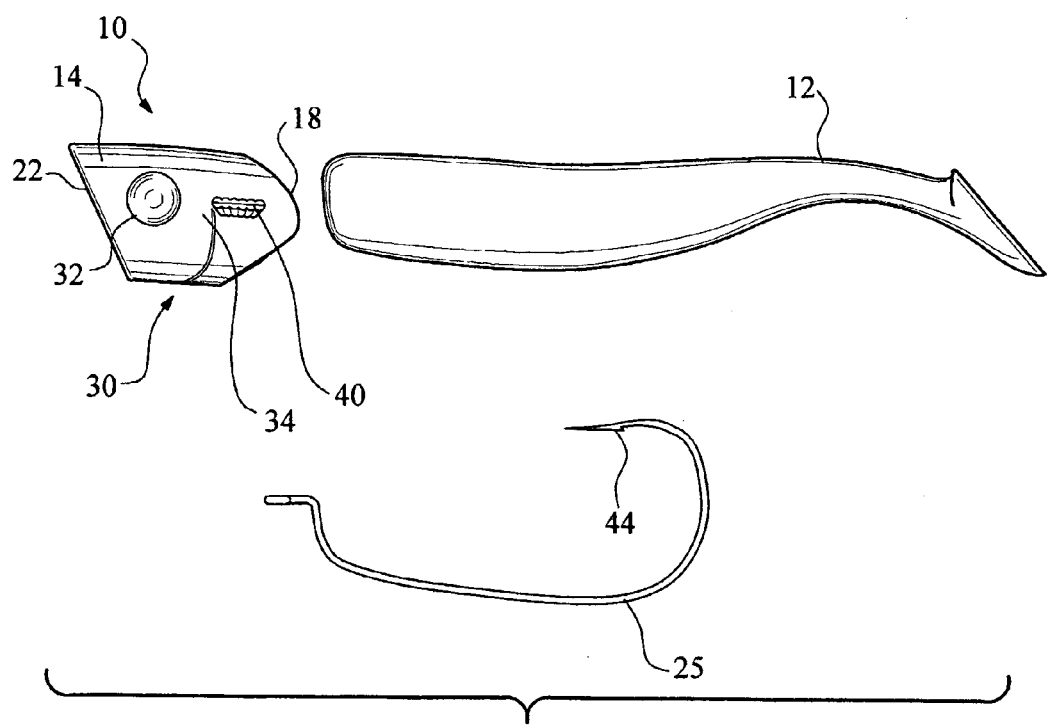
FIG. 4 is an exploded right side view of the removable head shown in FIG. 3.
Figure 5:
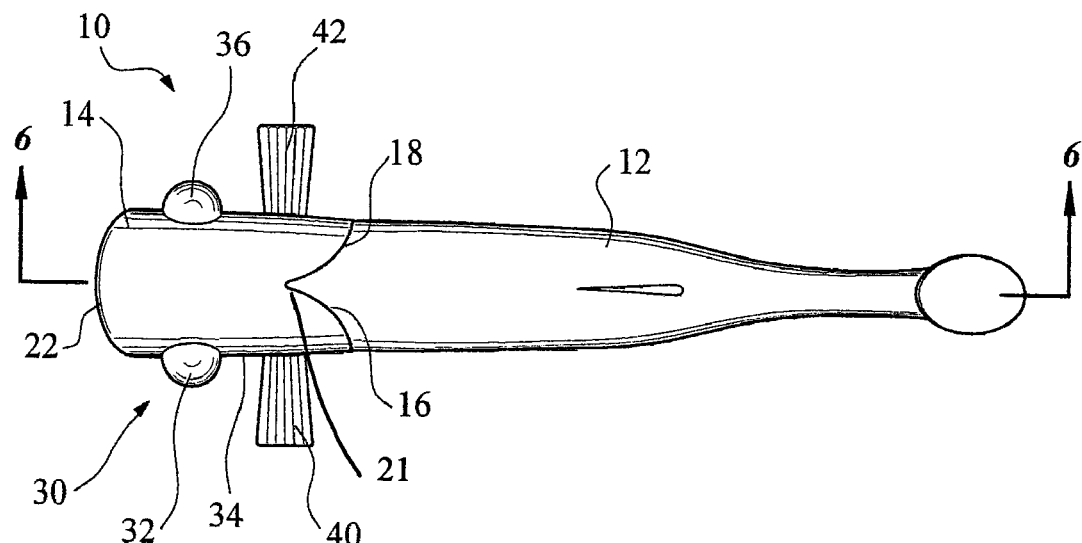
FIG. 5 is a top view of the removable head shown in FIG. 3 attached to a lure.

As shown in FIGS. 1-6, this invention is directed to a removable head 10 configured to be positioned on a fishing lure 12 that simulates a natural baitfish, crustacean, or other prey, such as, but not limited to, frogs, when suspended in water. The removable head 10 may be used to change the action of a fishing lure 12. The removable head 10 may cause a lure 12 to rise in a water column, to dive, to chug along the surface, or to produce a smoke trail of bubbles when retrieved rapidly, any combination of these actions, or other actions. As shown in FIGS. 3-5, the removable head 10 may be used together with a fishing lure 12, which may be a pliable fishing lure 12 such as a plastic lure 12, by pushing the head 10 onto the lure 12. The removable head 10 can change the action of the lure 12 favorably, thereby increasing the versatility of the lure 12.

Figure 6:
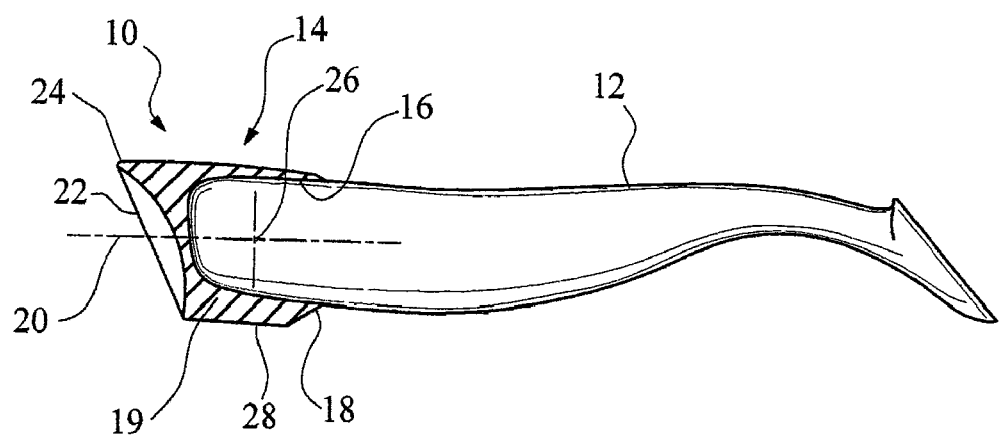
FIG. 6 is a partial cross section of the removable head attached to a lure taken along section line 6-6 in FIG. 5.

As shown in FIGS. 1, 2, and 6, the head 10 may be formed from a body 14. In at least one embodiment, the head 10 may be formed from a generally cylindrical body 14 or other appropriate shape. The outer diameter may be slightly larger than the size of a lure 12 on which the head 10 is to be positioned. In other embodiments, the body 14 may have other sizes. The body 14 may be sized in proportion with the lure 12 to which the body 14 is to be attached.

The body 14 may include a cavity 16 for receiving a lure 12. The cavity 16 may extend through a rear wall 18 of the body 14. The cavity 16 may be sized such that the cavity 16 can receive a lure 12. The cavity 16 may be about the same size as the lure 12. In at least one embodiment, an interference fit may be created when a lure 12 is inserted into the cavity 16. The material forming the body 14 may be tacky, thereby preventing the lure 12 from inadvertently separating from the body 14. The body 14 may be formed from, but is not limited to being, plastic. The cavity 16 may extend through the rear wall 18 generally along a longitudinal axis 20 of the body 14. The cavity 16 may extend through the body 14 and terminate in close proximity of a front face 22 of the body 14 such that a sufficient amount of material remains to prevent damage of the head 10. In at least one embodiment, the cavity 16 may be positioned such that a thickness of an outer wall 19 proximate to a bottom surface 28 may be greater than a thickness of the outer wall 19 proximate to a top surface 24, as shown in FIG. 6. The thickness of the outer wall 19 proximate to the bottom surface 28 prevents the head 10 from tearing or otherwise being significantly damaged by a hook 25 inserted into the head 10. The rear wall 18 may include groove 21 in the rear wall 18. The groove 21 may be configured such that a portion of the rear wall 18 forming the groove 21 extends closer to the front face 22 than remaining portions of the rear wall 18 thereby enabling the first and second sides 34, 38 of the body 14 to be separated to receive a head of the lure 12 into the cavity 16 in the body 14 and form a friction fit therein. Moving from one side 34 to the other side 38, the groove 21 forms a variable width in the head 10 such that the groove 21 increases moving from the first side 34 to the middle of the head 10 and then decreases from the middle of the head 10 to the other side 38. thereby enabling the sides 34, 38 to be movable during assembly of the head to a lure.

The head 10 may also include the front face 22 on the body 14 for changing the action of the lure 12. The front face 22 may have numerous different configurations. In at least one embodiment, as shown in FIGS. 3 and 6, the front face 22 may be angled relative to the longitudinal axis 20 of the body 14 such that the front face 22 proximate to an upper surface 24 of the body 14 extends further from a midpoint 26 of the body 14 along the longitudinal axis 20 of the body 14 than the front face 22 proximate to a lower surface 28 of the body 14. In at least one embodiment, the front face 22 may be positioned between about 45 degrees and about 75 degrees relative to the longitudinal axis 20, and more specifically, may be positioned at about 60 degrees. With this configuration, a lure 12 with the head 10 and suspended in water may rise in the water column when pulled through the water. The lure 12 may also dive when the head 10 is inverted on the lure 12 such that the front face 22 forms a diving lip on the lure 12. In alternative configurations, the front face 22 may be positioned at other angles relative to the longitudinal axis 20.

As shown in FIGS. 1 and 6, all or a portion of the front face 22 may be concave. The concave front face 22 provides additional action to the head 10. When the lure 12 with a head 12 attached thereto is on a water surface, the concave front face 22 may produce a strike inducing popping sound when retrieved with intermitting jerks.

The head 10 may also include one or more eyes 30. In at least one embodiment, the head 10 may include a first eye 32 on a first side 34 of the head 10 and a second eye 36 on a second side 38 of the head 10. The eyes 32, 36 may protrude from the surfaces of the first and second sides 34, 38 beyond an outer surface of the head 10. In at least one embodiment, the eyes 32, 36 may have a generally hemispherical shape. The protruding eyes 32, 36 enhance the silhouette of the lure 12. In an alternative embodiment, the eyes 30 may be in an indentation on the head 10 or on the outer surface of the head 10.

The head 10 may also include one or more lateral fins. As shown in FIGS. 2 and 5, the head 10 may include a first lateral fin 40 extending from the first side 34 and a second lateral fin 42 extending from the second side 38. The lateral fins 40, 42 may extend generally orthogonally relative to the longitudinal axis 20 of the body 14. In this configuration, the lateral fins 40, 42 may reduce the rate of sinking of the lure 12 in a water body. In alternative embodiments, the lateral fins 40, 42, may extend from the body 14 at other angles relative to the longitudinal axis 20.

In preparation for use, a lure 12 may be inserted into the cavity 16 in the head 10. A hook 25 may be installed in numerous manners. In at least one embodiment, as shown in FIG. 3, the hook 25 may be inserted through the front face 22, into the lure 12, and through the outer wall 19 proximate to the bottom surface 28. The hook 25 may re-enter the lure 12 and pass through the body of the lure 12 away from the head 10. The barb 44 of the hook 25 may be pressed against an outer surface of the lure 12 to conceal the barb 44 to make the lure 12 weedless. Once the head 10 has been positioned on a lure 12 and the hook 25 inserted, the lure 12 is ready for use.

During use, the head 10 and lure 12 may be cast with a conventional rod and reel. The head 10 enables the lure to be retrieved in numerous manners. For instance, the head 10, in at least one embodiment, makes the lure 12 about neutrally buoyant. Retrieving the lure 12 causes the lure to rise in the water column while the lure 12 is retrieved. The lure 12 may be retrieved at a steady rate or the rate of retrieval may be varied. Pausing the retrieval causes the lure to sink slowly, and retrieving the lure 12 causes the lure 12 to rise in the water column. Such action may provoke a strike from a nearby fish.

The head 10 having the configuration shown in FIGS. 1 and 2, may also be inserted onto a lure 12 in an upside down manner. This configuration causes the lure 12 to dive when retrieved. The depth to which the lure 12 may dive depends on numerous factors, such as, but not limited to, the size and angle of the front face 22, the position of the rod tip relative to the water surface during retrieval, and others. A diving lure 12 may be advantageous under some conditions.

The head 10 may also be used as a popping head 10. The lure 12 may be retrieved so that the lure 12 remains in close proximity to the water surface. The lure 12 may be jerked at various intervals producing a popping sound that attracts fish and draws strikes.

It should be understood that the examples and embodiments described herein are for illustrative purposes only and that various modifications or changes in light thereof will be obvious to persons skilled in the art, and that such modifications or changes are to be included within the spirit and purview of this application. Moreover, the invention can take other specific forms without departing from the spirit or essential attributes thereof.

I claim:

1. A removable head for an artificial fishing lure, comprising:
    a body forming the removable head;
    a cavity positioned in the body for receiving a head of the artificial fishing lure and extending through a rear wall of the body; and
    a front face on the body configured to create an action in the fishing lure when the lure is pulled through a water body;
    wherein the front face is angled such that the front face proximate to an upper surface of the body extends further from a midpoint of the body along a longitudinal axis of the body than the front face proximate to a lower surface of the body;
    a first lateral fin extending from a first side of the body and a second lateral fin extending from a second side of the body generally opposite the first lateral fin; and
    a groove in the rear wall of the body for facilitating attachment of the removable head to the artificial fishing lure, wherein the groove is configured such that a portion of the rear wall forming the groove extends closer to the front face than remaining portions of the rear wall thereby enabling the first and second sides of the body to be separated to receive a head of the lure into the cavity in the body and form a friction fit therein.

2. The removable head of claim 1, wherein the cavity is positioned generally along a longitudinal axis of the body forming the removable head.

3. The removable head of claim 1, further comprising a plurality of eyes extending beyond an outer surface of the body.

4. The removable head of claim 1, where the front face is angled between about 45 degrees and about 75 degrees relative to the longitudinal axis of the body.

5. The removable head of claim 4, wherein the front face is angled at about 60 degrees relative to the longitudinal axis of the body.

6. The removable head of claim 1, wherein the front face is concave.

7. The removable head of claim 1, wherein the body is generally cylindrical.

8. The removable head of claim 1, wherein the cavity may be positioned such that a thickness of an outer wall of the body proximate to a bottom surface may be greater than a thickness of the outer wall proximate to a top surface thereby preventing the removable head from tearing by a hook inserted into the head.

9. A removable head for an artificial fishing lure, comprising:
    a generally cylindrical body forming the removable head;
    a cavity positioned in the generally cylindrical body for receiving a head of the artificial fishing lure and extending through a rear wall of the body into close proximity to a front face;
    a front face on the body;
    a first eye protruding from a first side of the body proximate to the front face; and
    a second eye protruding from a second side of the body generally opposite to the first eye and proximate to the front face;
    wherein the front face is angled such that the front face proximate to an upper surface of the body extends further from a midpoint of the body along a longitudinal axis of the body than the front face proximate to a lower surface of the body;
    a first lateral fin extending from a first side of the body and a second lateral fin extending from a second side of the body generally opposite the first lateral fin;
    a groove in the rear wall of the body for facilitating attachment of the removable head to the artificial fishing lure, wherein the groove is configured such that a portion of the rear wall forming the groove extends closer to the front face than remaining portions of the rear wall thereby enabling the first and second sides of the body to be separated to receive a head of the lure into the cavity in the body and form a friction fit therein; and
    wherein the cavity may be positioned such that a thickness of an outer wall of the body proximate to a bottom surface may be greater than a thickness of the outer wall proximate to a top surface thereby preventing the removable head from tearing by a hook inserted into the head.

10. The removable head of claim 9, wherein the cavity is positioned generally along a longitudinal axis of the body forming the removable head.

11. The removable head of claim 9, where the front face is angled between about 45 degrees and about 75 degrees relative to the longitudinal axis of the body.

12. The removable head of claim 11, wherein the front face is angled at about 60 degrees relative to the longitudinal axis of the body.

13. The removable head of claim 9, wherein the front face is concave.

14. The removable head of claim 9, wherein the first and second eyes are generally hemispherical.

15. A removable head for an artificial fishing lure, comprising:
- a body forming the removable head;
- a cavity positioned in the body for receiving a head of the artificial fishing lure and extending through a rear wall of the body; and
- a front face on the body configured to create an action in the fishing lure when the lure is pulled though a water body;
- wherein the front face is angled such that the front face proximate to an upper surface of the body extends further from a midpoint of the body along a longitudinal axis of the body than the front face proximate to a lower surface of the body;
- a first lateral fin extending from a first side of the body and a second lateral fin extending from a second side of the body generally opposite the first lateral fin; and
- a groove in the rear wall of the body for facilitating attachment of the removable head to the artificial fishing lure, wherein the groove is configured such that a portion of the rear wall forming the groove extends closer to the front face than remaining portions of the rear wall thereby enabling the first and second sides of the body to be separated to receive a head of the lure into the cavity in the body and form a friction fit therein;
- wherein the cavity may be positioned such that a thickness of an outer wall of the body proximate to a bottom surface may be greater than a thickness of the outer wall proximate to a top surface thereby preventing the removable head from tearing by a hook inserted into the head; and
- wherein the front face is concave.

16. The removable head of claim 15, wherein the cavity is positioned generally along a longitudinal axis of the body forming the removable head.

17. The removable head of claim 15, where the front face is angled between about 45 degrees and about 75 degrees relative to the longitudinal axis of the body.

18. The removable head of claim 17, wherein the front face is angled at about 60 degrees relative to the longitudinal axis of the body.

* * * * *